United States Patent
Carew et al.

(10) Patent No.: US 6,212,483 B1
(45) Date of Patent: Apr. 3, 2001

(54) APPARATUS AND METHOD OF PROVIDING DIAGNOSTIC INFORMATION TO AN OPERATOR

(75) Inventors: Kevin J. Carew, Peoria; Robert R. Sychra, Washington, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/159,248

(22) Filed: Sep. 23, 1998

(51) Int. Cl.[7] .................................................. G06F 11/30
(52) U.S. Cl. ..................... 702/183; 702/184; 702/185; 701/29; 701/30; 701/31; 701/34; 701/35; 701/50
(58) Field of Search .................................. 702/183, 184, 702/185; 701/29–31, 34–35, 50

(56) References Cited

U.S. PATENT DOCUMENTS

| | | | |
|---|---|---|---|
| 5,371,487 | * 12/1994 | Hoffman et al. | 340/425.5 |
| 5,532,927 | * 7/1996 | Pink et al. | 701/34 |
| 5,648,898 | * 7/1997 | Moore-McKee et al. | 701/29 |
| 5,657,224 | * 8/1997 | Lonn et al. | 701/29 |
| 5,949,330 | * 9/1999 | Hoffman et al. | 340/438 |

* cited by examiner

Primary Examiner—Marc S. Hoff
Assistant Examiner—Hien Vo
(74) Attorney, Agent, or Firm—Byron G. Buck; W. Bryan McPherson, III

(57) ABSTRACT

The present invention relates to an apparatus and method of providing diagnostic information to an operator of a work machine. Whether the work machine control system is in diagnostic messaging mode is determined. At least one diagnostic fault parameter descriptive message is read from a memory. The diagnostic fault parameter descriptive message is provided to the operator. Preferably, diagnostic messaging mode is determined by whether the work machine control system is in service mode and whether the diagnostic text function is selected. Advantageously, a component identification number descriptive message is provided in a first character display and a failure mode indicating number descriptive message is provided in a second character display of an operator interface.

6 Claims, 4 Drawing Sheets

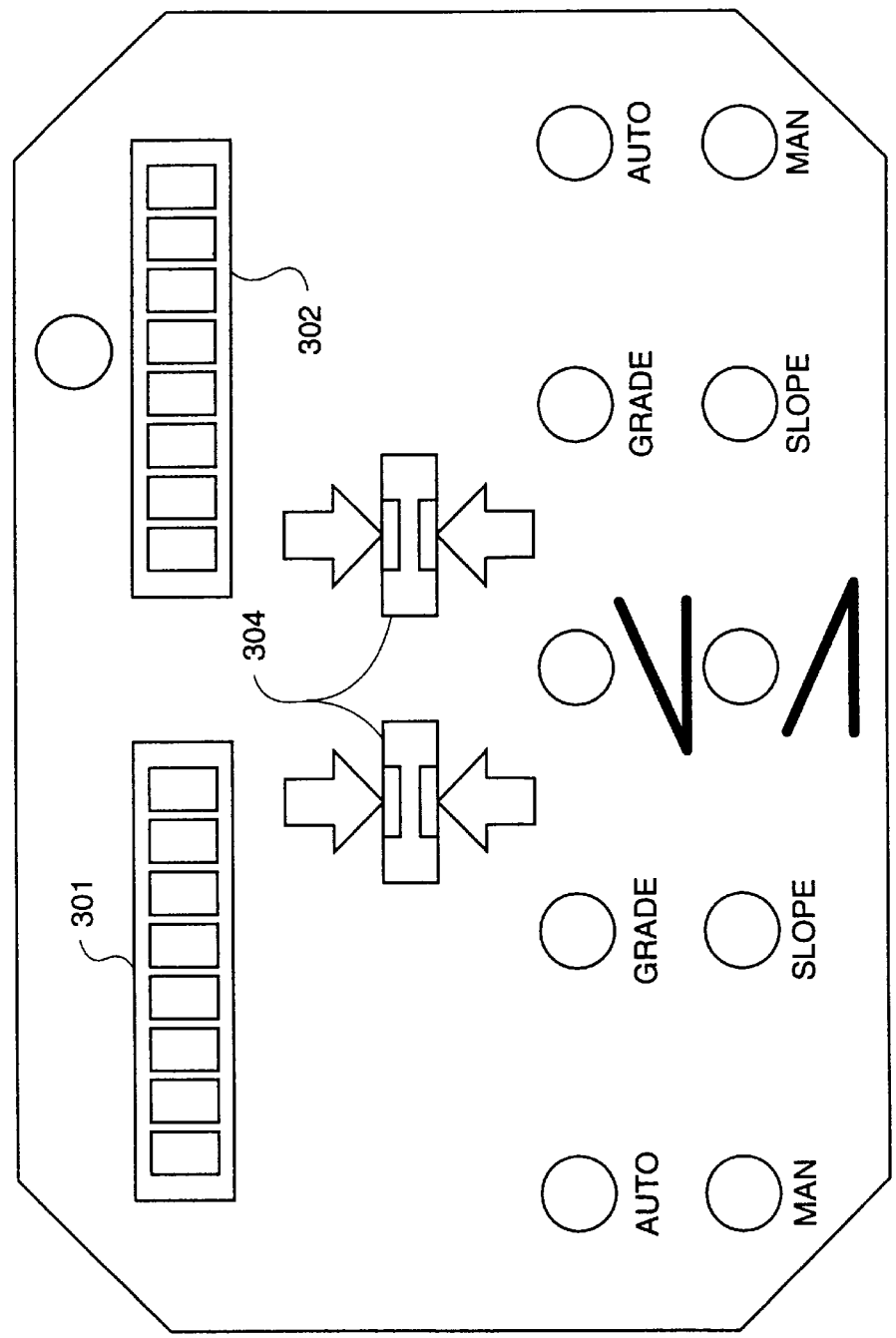

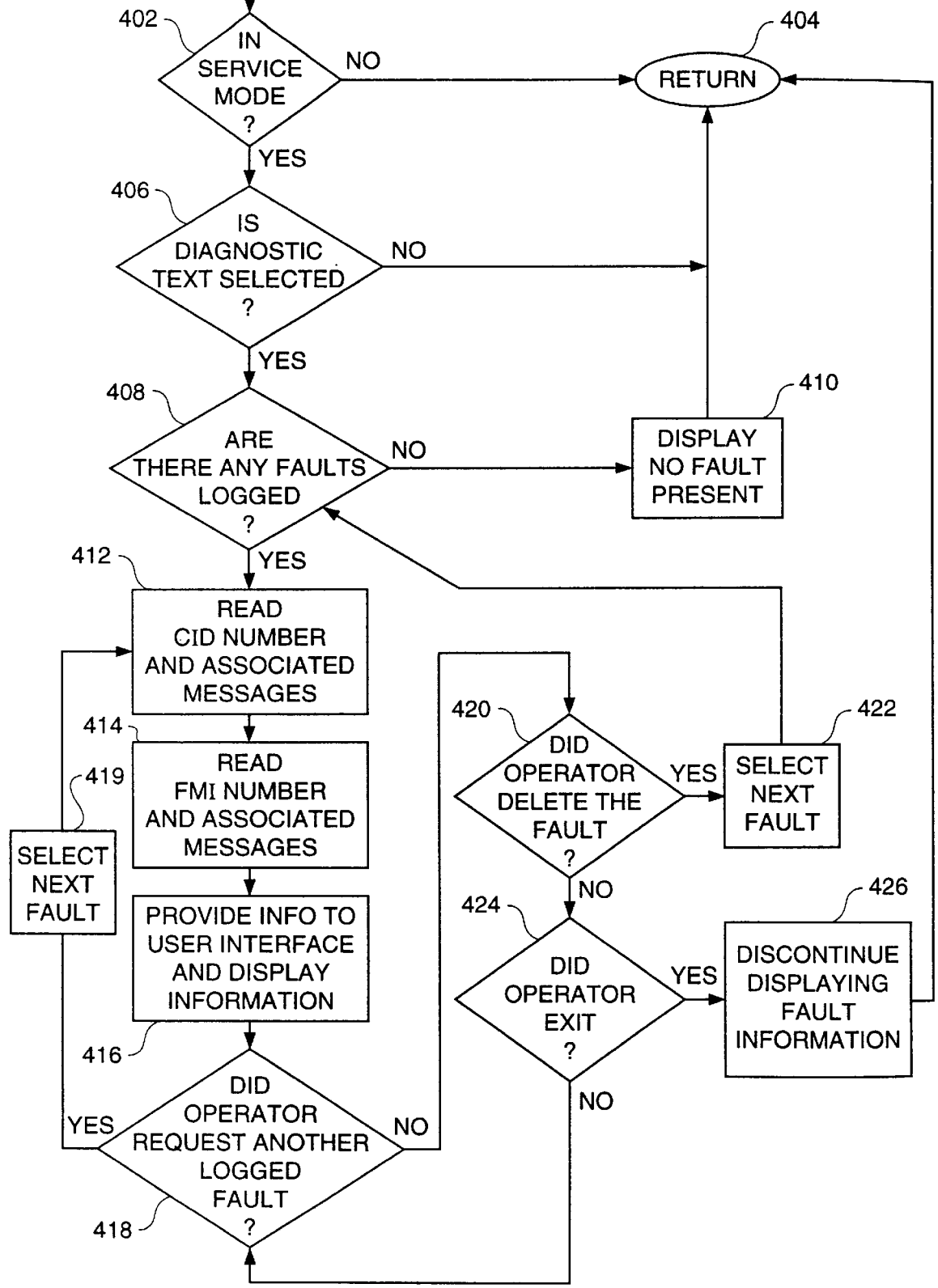

APPARATUS AND METHOD OF PROVIDING DIAGNOSTIC INFORMATION TO AN OPERATOR

TECHNICAL FIELD

This invention relates generally to an apparatus and method of providing diagnostic information to an operator of a work machine and, more particularly, to an apparatus and method that provides at least one diagnostic fault parameter descriptive message to the operator.

BACKGROUND ART

Work machines having an attached implement, such as motor graders, excavators, mining shovels, cold planer, backhoes, wheel loaders, track type tractors, and the like, are used for moving earth. Such implements may include blades, impact rock rippers, and other material handling apparatus. Typically, work machines may be configured to perform various work cycles. For example, a motor grader typically has a blade used to cut a particular grade and/or slope across the ground. Because the motor grader has many joints in a range of movement, many sensors, electronic circuits, solenoids, and mechanisms used to provide control of the work machine. Sometimes, these portions of the work machine can fail or malfunction if not maintained properly. Currently, on work machines, it is possible to damage the machine or incorrectly move or cut the earth if portions of the work machine are not functioning properly. For example, on a motor grader, if a grade sensor malfunctions, the motor grader will not cut the proper grade and/or slope across the ground. Similarly, if a slope sensor malfunctions, a motor grader will not cut the proper slope and/or grade across the ground. This could cause damage to the blade of the motor grader or provide an incorrect finished grade and/or slope to the ground.

Additionally, current diagnostic display systems on work machines typically provide abbreviations or codes representative of a fault condition to an operator. For example, a numerical code may be provided to an operator to indicate a failed grade sensor on a motor grader. Generally, once the operator receives the abbreviation or numerical code, the operator must use a cross reference table or the user's manual to interpret and identify the particular component and type of fault represented by the abbreviation or numerical code.

It is undesirable to force the operator to retain a cross reference chart and keep it with the work machine. Similarly, it is undesirable to force the operator to refer to the user's manual in order to understand the abbreviation or numerical code, particularly when work machines are used on a large construction site, large mining site, or rented and the documentation for the machine is kept in a remote office. In this situation, it is difficult for operators, particularly new or less skilled operators, to interpret and understand the abbreviated or numerical codes.

Accordingly, the art has sought an apparatus and method of providing diagnostic information to an operator of the work machine which: provides at least one diagnostic fault parameter descriptive message to the operator; eliminates the need for an operator to refer to a cross reference chart or other documentation to understand the diagnostic fault parameter; reduces the required skill and knowledge for an operator of the work machine; and is more economical to use.

The present invention is directed to overcoming one or more of the problems as set forth above.

DISCLOSURE OF THE INVENTION

In one aspect of the present invention, a work machine adapted to be controlled by an operator is provided. The work machine includes a frame, a plurality of ground engaging devices, an operator compartment, an engine, and a work machine control system. The frame and operator compartment are supported by the ground engaging devices. The engine is operably coupled to the ground engaging devices. The work machine control system has a diagnostic display system which includes a memory, a controller, and an operator interface. The memory is adapted to store diagnostic fault parameter descriptive messages. The controller is associated with the memory and is adapted to receive the diagnostic parameter descriptive messages, determine whether the work machine control system is in diagnostic messaging mode, and responsively provide at least one diagnostic fault parameter descriptive message to the operator interface. The operator interface receives the diagnostic fault parameter descriptive message and provides the diagnostic fault parameter descriptive message to the operator in the operator compartment.

In another aspect of the present invention, a method of providing diagnostic information to an operator of a work machine is provided. A determination is made as to whether the work machine control system is in diagnostic messaging mode. At least one diagnostic fault parameter descriptive message is read from memory. The diagnostic fault parameter descriptive message is provided to the operator.

In another aspect of the present invention, a method of providing diagnostic information to an operator of a work machine is provided. A determination is made as to whether the work machine control system is in service mode. A determination is made as to whether diagnostic text is selected. A determination is made as to whether the work machine control system is in diagnostic messaging mode. A determination is made as to whether there are any diagnostic fault parameters stored in memory. At least one diagnostic fault parameter descriptive message is read from memory. The diagnostic fault parameter descriptive message is provided to the operator in a scrolling text message on a display.

These and other aspects and advantages of the present invention will become apparent to those skilled in the art upon reading the detailed description of the best mode for carrying out the invention in connection with the drawings and appended claims.

BRIEF DESCRIPTION OF DRAWINGS

For a better understanding of the invention, reference may be made to accompanying drawings, in which:

FIG. 3 is a top view of an operator interface used in connection with the preferred embodiment of the present invention; and FIG. 4 is a flowchart of software logic implemented in a preferred embodiment of the present invention.

BEST MODE FOR CARRYING OUT THE INVENTION

Figure 1:
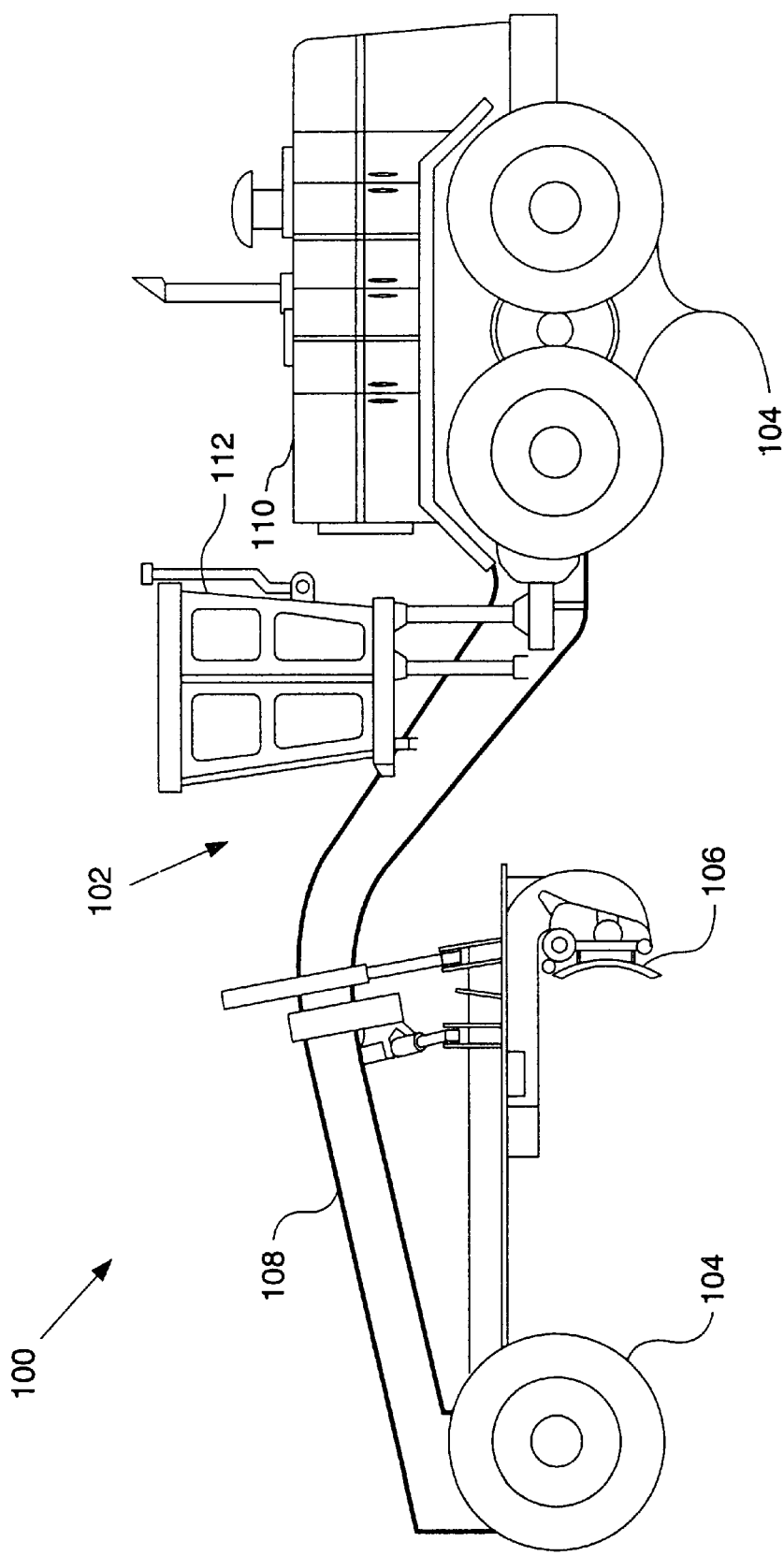
FIG. 1 is a side elevational view of a motor grader according to one embodiment of the present invention.

A preferred embodiment of the present invention provides an apparatus and method of providing diagnostic information to an operator of a work machine 100. The following description uses a motor grader 102 having wheels 104 and an implement, typically a blade 106, as an example only. This invention can be applied to other types of work machines 100 having tracks (not shown) instead of wheels 104 and other types of implements well known in the art. Other examples include mining shovels, cold planers, wheel loaders, backhoes, track type tractors, hydraulic excavators, track type loaders, and the like.

In FIG. 1, a frame 108 is supported by a plurality of ground engaging devices 104. An engine 110 is operably coupled to the ground engaging devices 104. Additionally, an operator compartment 112 is supported by the ground engaging devices 104.

Figure 2:
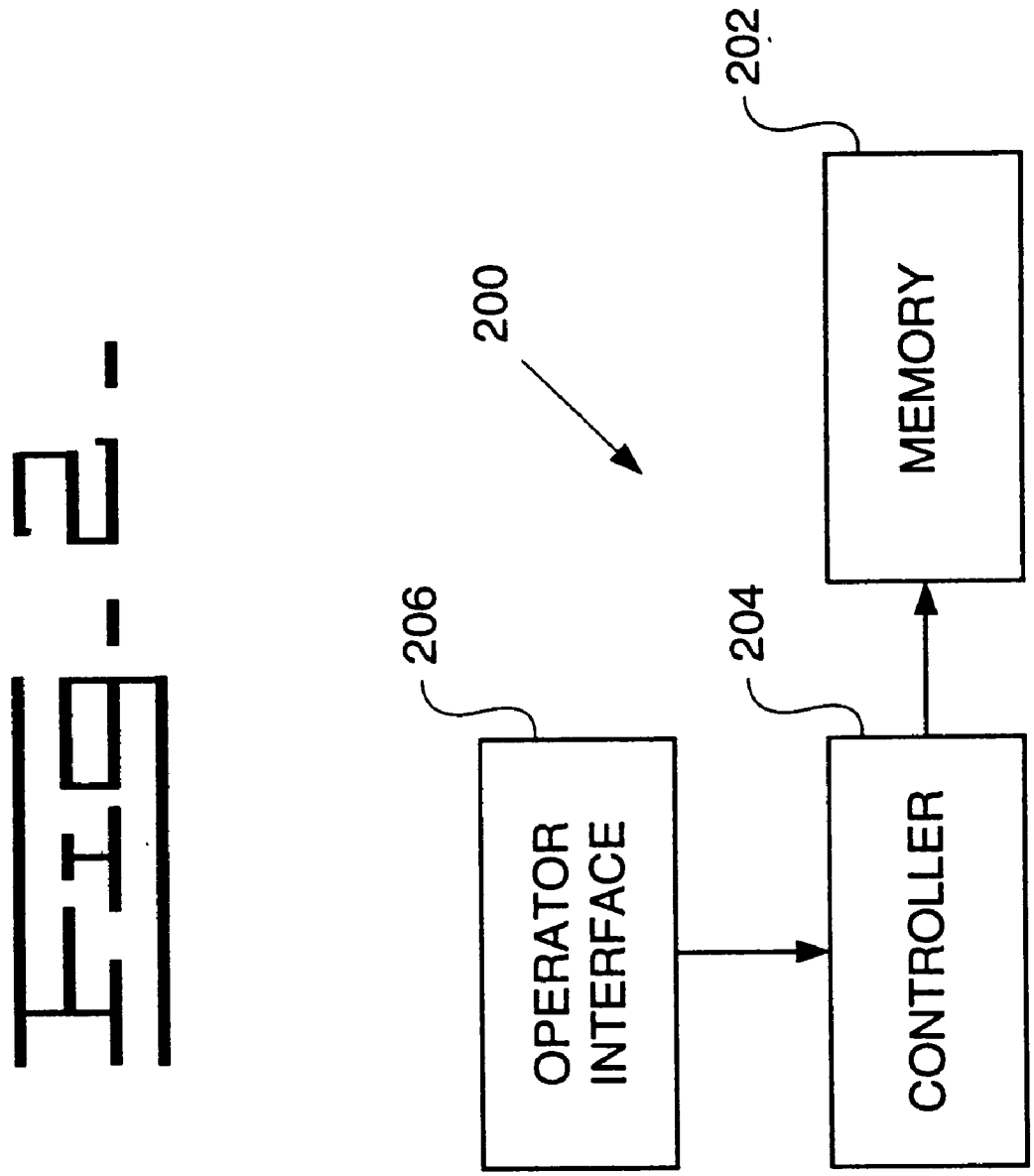
FIG. 2 is a schematic view of a diagnostic display system used in connection with the preferred embodiment of the present invention.

In FIG. 2, the work machine 100 includes a diagnostic display system 200 sufficient to provide at least one diagnostic fault parameter descriptive message to the operator. Preferably, a diagnostic display system 200 includes a memory 202 associated with a controller 204 and an operator interface 206. preferably, the memory 202 is adapted to store at least one diagnostic fault parameter descriptive message. Advantageously, diagnostic fault parameters such as those shown in the left column of Tables A and B shown below are stored in memory 202. Additionally, a descriptive message such as the messages indicated in the right columns of Tables A and B below are stored in memory 202.

TABLE A

| FAILURE MODE INDICATING (FMI) NUMBER | TEXT DISPLAY |
|---|---|
| 0 | DATA ABOVE NORMAL |
| 1 | DATA BELOW NORMAL |
| 2 | ERRATIC DATA |
| 3 | VOLTAGE TO HIGH OR SHORT TO BATTERY |
| 4 | VOLTAGE TO LOW |
| 5 | OPEN CIRCUIT |
| 6 | SHORT TO GROUND |
| 8 | ABNORMAL INPUT SIGNAL |
| 9 | ABNORMAL TRANSMISSION |
| 12 | FAILED DRIVER |
| 13 | OUT OF CALIBRATION |
| DEFAULT | SEE SERVICE MANUAL |

TABLE B

| COMPONENT IDENTIFICATION (CID) NUMBER | TEXT DISPLAY |
|---|---|
| 168 | SYSTEM BATTERY VOLTAGE |
| 254 | CDL COMMUNICATION ERROR |
| 650 | MACHINE HARNESS |
| 856 | BLADE SLOPE SENSOR |
| 857 | FRAME SLOPE SENSOR |
| 900 | LEFT RAISE SOLENOID |
| 901 | LEFT LOWER SOLENOID |
| 902 | RIGHT RAISE SOLENOID |
| 903 | RIGHT LOWER SOLENOID |
| 906 | LEFT GRADE SENSOR |
| 907 | RIGHT GRADE SENSOR |
| 908 | BLADE ROTATION SENSOR |
| 909 | CONSOLE DISPLAY |
| 919 | HORN |
| DEFAULT | SEE SERVICE MANUAL |

The foregoing diagnostic fault parameters and descriptive messages are representative of diagnostic fault parameters and descriptive messages. However, other parameters and messages well known in the art could be readily and easily used with the present invention without departing from the scope of the present invention as defined by the appended claims.

An operator interface 206 is adapted to provide at least one configuration parameter to the operator in the operator compartment. The operator interface 206 may be a liquid crystal display, console, keyboard, push buttons, voice recognition devices, a laptop computer, speakers, or other interfaces well known in the art or, preferably, two eight character displays 301, 302 in combination with switches 304. Preferably, the operator interface 206 is adapted to provide the diagnostic fault parameter descriptive message corresponding to a CID number to the operator in a scrolling text message on a first display 301 and provide the diagnostic fault parameter descriptive message corresponding to a FMI number to the operator in a scrolling text message across a second display 302 of the user interface 206. Alternatively, the operator interface 206 may be adapted to provide the descriptive message to the operator as an audible message.

A preferred embodiment of the operator interface 206 is shown in FIG. 3 as having a first eight character display 301 and a second eight character display 302. Preferably, operator input switches 304 are included in the operator interface 206.

Referring back to FIG. 2, controller 204 is associated with the memory 202 and receives the at least one diagnostic fault parameter descriptive message from the memory 202. Further, controller 204 is adapted to receive the diagnostic parameter descriptive message, determine whether the work machine control system is in diagnostic messaging mode, and responsibly provide the diagnostic parameter descriptive message to the operator interface 206.

Referring now to FIG. 4, a flowchart of the software logic used in connection with the preferred embodiment is shown. Those skilled in the art could readily and easily write software implementing the flowchart shown in FIG. 4 using the instruction set, or other appropriate language associated with the particular microprocessor to be used. In a preferred embodiment, a Motorola 68HC11 is used in the electronic controller 204. However, other known microprocessors could be readily and easily used without deviating from the scope of the present invention as defined in the appended claims.

First block 401 begins the program control. Program control passes from first block 401 to first decision block 402. In first decision block 402. the electronic controller 204 determines whether the control system is in service mode. Service mode is typically a function where the work machine is made available for various maintenance and evaluation functions. If the control system is not in service mode, program control passes to second block 404. Otherwise, program control passes to second decision block 406.

In second decision block 406, the electronic controller 204 determines whether the control system determines whether the diagnostic text function is selected. In an alternative embodiment of the present invention, first decision block 402 and second decision block 406 could be replaced by a single decision block wherein the controller 204 could use any of several parameters to determine whether a control system is in diagnostic messaging mode. If the diagnostic text function is not selected or, alternatively, if a control system is not in diagnostic messaging mode, program control passes to second block 404. Otherwise, program control passes to third decision block 408.

In third decision block 408, the controller 204 determines whether there are any faults logged. Preferably, this determination is accomplished by reading from memory 202 any diagnostic fault parameters. Alternatively, those skilled in the art could readily and easily provide this information to controller 204 through the use of flags or other parameters commonly known within the art. If there are not any faults logged, program control passes to third block 410. Otherwise, program control passes to fourth block 412.

In third block 410, the controller 204 provides a no fault present message to the operator interface 206. Preferably, the operator interface displays the diagnostic fault parameter descriptive message indicating that there is no fault present. From third block 410, program control passes to second block 404.

Referring back to fourth block 412, program control reads the component identification number (CID) and associated descriptive message of the diagnostic fault to be provided to the operator. CID numbers and associated descriptive messages representative of the diagnostic faults representative of possible diagnostic fault parameters are provided in the left and right columns, respectively, of Table B above. CID numbers and associated descriptive messages provided in Table B above are merely given to represent the nature of the information to be provided. However, those skilled in the art could readily and easily identify other messages to be provided to the operator. From fourth block 412, program control passes to fifth block 414.

In fifth block 414, program control reads the failure mode indicating (FMI) number and associated descriptive message from memory 202 to be provided to the operator interface 206. Several FMI numbers and associated descriptive messages representative of the nature of the information to be provided to the operator are shown in the left and right columns, respectively, of Table A above. These FMI numbers and associated descriptive messages are provided as an example only. Those skilled in the art could readily and easily identify other information to be provided to the operator. From fifth block 414, program control passes to sixth block 416.

In sixth block 416, the controller 204 provides the descriptive message to the user interface 206. The user interface 206 receives the diagnostic fault parameter descriptive message from the controller 204 and provides the information to the operator. Preferably, the operator interface 206 provides the CID number diagnostic fault parameter descriptive message in a scrolling text message in the first eight character display 301 and the FMI number diagnostic fault parameter descriptive message in a scrolling text message across the second eight character display 302. From sixth block 416, program control passes to fourth decision block 418.

In fourth decision block 418, a controller 204 determines whether the operator requested another logged fault. Preferably, the operator may request another logged fault by actuating one of the operator input switches 304. However, those skilled in the art could readily and easily identify other ways for the operator to request another logged fault and methods of determining this request. These should be understood to fall within the scope of the present invention as defined by the appended claims. If the operator did request another logged fault, program control passes to ninth block 419. Otherwise, program control passes to fifth decision block 420. In ninth block 419, the controller 204 selects the next fault. From ninth block 419, program control returns to third decision block 412.

Referring back to fifth decision block 420, the controller 204 determines whether the operator deleted the fault. Preferably, the operator may use operator input switches 304 to delete a fault stored in memory 202. If the operator did delete the fault, program control passes to seventh block 422. Otherwise, program control passes to sixth decision block 424.

In sixth decision block 424, the controller 204 determines whether the operator chose to exit service mode or, alternatively, diagnostic messaging mode. If the operator did not exit, then program control returns to fourth decision block 418. Otherwise, program control passes to eighth block 426.

In eighth block 426, the controller 204 provides a command to the operator interface 206 to discontinue displaying diagnostic fault information. From eighth block 426, program control passes to second block 404.

Referring back to seventh block 422, program control selects the next diagnostic fault from memory 202. From seventh block 422, program control passes back to third decision block 408.

In second block 404, program control returns to the main program. The logic of FIG. 4 is performed every control loop in order to provide the diagnostic fault information to the operator in a timely manner. However, those skilled in the art know that the aspects of the work machine control system could be determined at other frequencies depending on other factors without deviating from the invention as defined by the appended claims.

While aspects of the present invention have been particularly shown and described with reference to the preferred embodiment above, it will be understood by those skilled in the art that various additional embodiments may be contemplated without departing from the spirit and scope of the present invention. For example, instead of or in conjunction with providing a scrolling text message to the operator, an audible message could be provided to the operator. Further, numerical or code messages could be provided on one display and a descriptive message could scroll across a second display. However, a device or method incorporating any such additional embodiment should be understood to fall within the scope of the present invention as determined based upon the claims below and any equivalents thereof.

Industrial Applicability

Motor graders 102 having a blade 106 are often used to cut a grade and/or a slope across the earth. To accomplish this, often electronic control is used to assist the operator with controlling the blade 106 to provide the desired slope and/or grade. The electronic controls typically are associated with several sensors, solenoids, circuits, and related mechanisms. If one of these fail, it is advantageous for the operator to receive the diagnostic fault information in a manner that is easily and readily understood by almost anyone familiar with work machines, including new operators or operators possessing a relatively low level of skill or familiarity with the work machine.

The apparatus and method of certain embodiments of the present invention, when compared with other methods and apparatus, may have the advantages of providing at least one diagnostic fault parameter descriptive message to the operator; eliminating the need for an operator to refer to a cross reference chart or other documentation to understand the diagnostic fault parameter; reducing the skill and knowledge required for an operator of the work machine; and being more economical to use. Such advantages are particularly worthy of incorporating into the design, manufacture, and operation of work machines. In addition, the present invention may provide other advantages that have not been discovered yet.

It should be understood that while the preferred embodiment is described in connection with motor graders 102 having a blade 106, the present invention is readily adaptable to provide diagnostic fault parameters to the operator on other work machines.

Other aspects, objects, and advantages of the present invention can be obtained from a study of the drawings, the disclosure, and the appended claims.

What is claimed is:

1. A work machine adapted to be controlled by an operator, comprising:
   a frame;
   a plurality of ground engaging devices supporting the frame;
   an operator compartment supported by the ground engaging devices;
   an engine operably coupled to the ground engaging devices; and
   a work machine control system having a diagnostic display system, including:
      a memory adapted to store at least one diagnostic fault parameter descriptive message;
      a controller associated with the memory and adapted to receive the at least one diagnostic fault parameter descriptive message, determine whether the work machine control system is in diagnostic messaging mode, and responsively provide the at least one diagnostic fault parameter descriptive message; and
      an operator interface adapted to receive the at least one diagnostic fault parameter descriptive message and provide the at least one diagnostic fault parameter descriptive message to the operator in the operator compartment, said operator interface including a first display and a second display, said descriptive message being displayed as a scrolling text message on one of said first and second displays.

2. The work machine of claim 1, wherein the operator interface is adapted to provide the descriptive message to the operator in the operator compartment as a scrolling text message.

3. A method of providing diagnostic information to an operator of a work machine, the work machine including a first and second display, comprising the steps of:
   determining whether the work machine control system is in diagnostic messaging mode;
   reading at least one diagnostic fault parameter descriptive message from a memory; and
   providing the at least one diagnostic fault parameter descriptive message to the operator, wherein said message is displayed as a scrolling text message on one of the first and second displays.

4. The method of claim 3, wherein the step of providing the at least one diagnostic fault parameter descriptive message to the operator includes providing an audible message to the operator from a user interface.

5. The method of claim 3, including the step of providing at least one additional diagnostic fault parameter descriptive message to the operator in response to an operator input, said additional message being displayed on the other of said first and second displays.

6. A method of providing diagnostic information to an operator of a work machine, the work machine including a first display and a second display, comprising the steps of:
   determining whether the work machine control system is in service mode;
   determining whether diagnostic text is selected;
   determining whether the work machine control system is in diagnostic messaging mode in response to the steps of determining whether the work machine control system is in service mode and determining whether diagnostic text is selected;
   determining whether there are any diagnostic fault parameters stored in memory;
   reading at least one diagnostic fault parameter descriptive message from a memory; and
      providing the at least one diagnostic fault parameter descriptive message to the operator in a scrolling text message on one of the first display and second display of the user interface while the work machine control system is in diagnostic messaging mode.

* * * * *